(No Model.)
J. MORRISON.
REGENERATIVE GAS FURNACE.
No. 309,643. Patented Dec. 23, 1884.
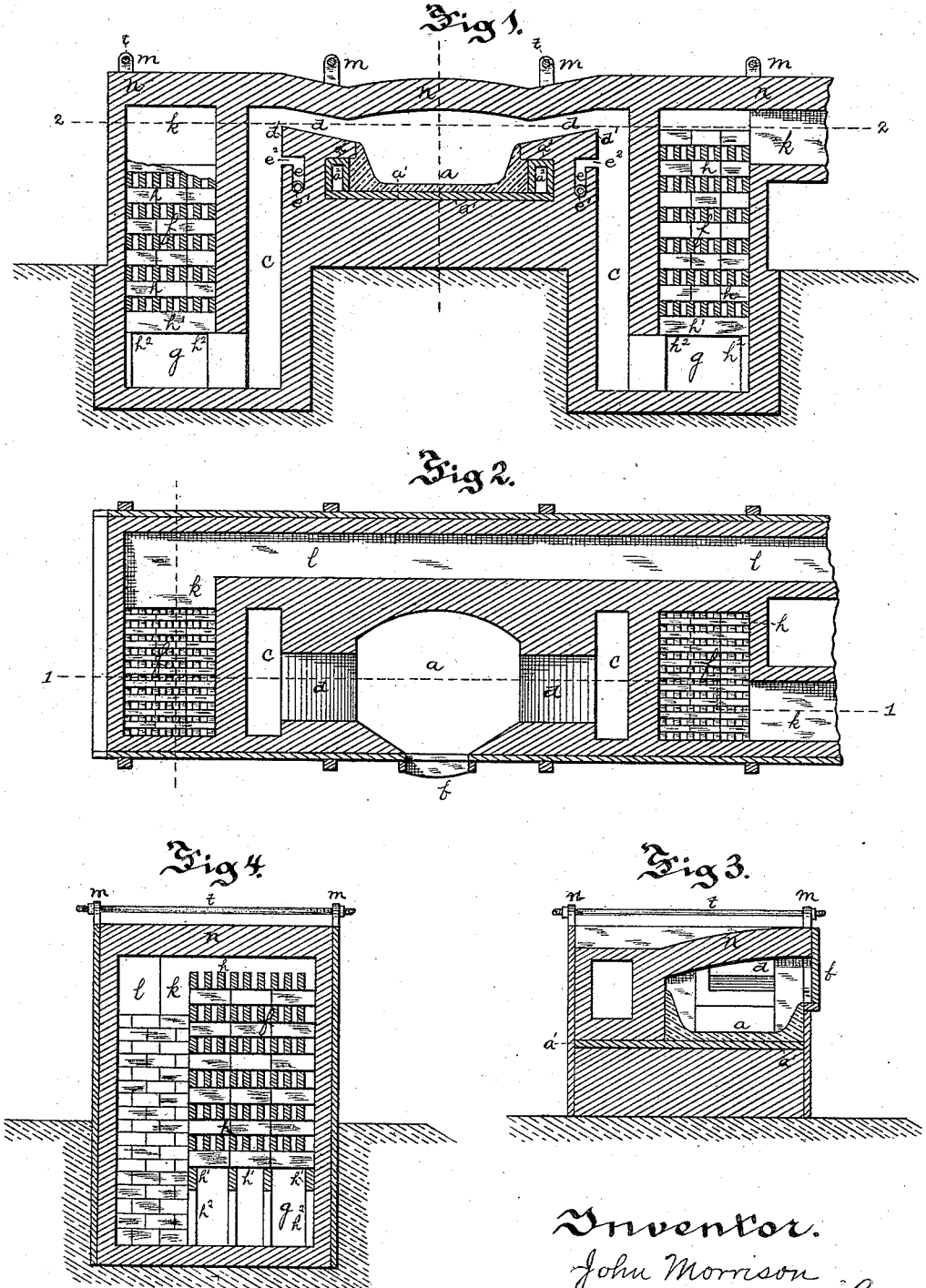
Witnesses.
J. N. Cooke
L. P. Blanchard
Inventor.
John Morrison
by James I. Kay
Attorney

UNITED STATES PATENT OFFICE.

JOHN MORRISON, OF PITTSBURG, PENNSYLVANIA.

REGENERATIVE GAS-FURNACE.

SPECIFICATION forming part of Letters Patent No. 309,643, dated December 23, 1884.

Application filed June 13, 1884. (No model.)

*To all whom it may concern:*

Be it known that I, JOHN MORRISON, of Pittsburg, in the county of Allegheny and State of Pennsylvania, have invented a new and useful Improvement in Regenerative Gas-Furnaces; and I do hereby declare the following to be a full, clear, and exact description thereof.

My invention relates to furnaces used for puddling iron and heating and melting metals, glass, &c., having reference to what are termed "regenerative furnaces;" and its special object is to improve the construction of these furnaces for burning natural gas. In these furnaces as heretofore constructed one regenerator was employed at each side of the furnace-bed, and the products of combustion were conducted down through one of the regenerators, according to the direction of the draft, to flues under the furnace leading to the stack, the natural gas being admitted at or near the bridge-walls of the furnace, and passing out either into the checker-work near the top thereof or melting and mingling with the heated air at the mouth of the regenerator. Practical experience has proven, however, that the heat and flame generated often pass from the bed into the generator, and the intense heat rapidly melts and burns out the checker-work, and that the checker-work soon becomes clogged and choked and is necessarily replaced. Where the flues lead from the bottom of the regenerator to the stack, as they pass under the regenerators they extend farther down under the furnace than is desirable, and where these furnaces are built on ground made from the slag or scoria from the furnaces, as is often the case in city mills, the heat of the waste products passing through these flues often ignites this slag and causes much trouble and in some cases conflagrations. To overcome these objections, and to further improve the construction of these furnaces, I have provided them with vertical flues extending down from the furnace-chamber to the base of the regenerators, and flues leading from the top of the regenerators to the stack, so that the heated products of combustion pass down these flues and rise up through the regenerators, and thence to the stack, so that the flame and intense heat of the products of combustion are exhausted before entering the regenerators, and consequently the rapid burning out of the regenerators is prevented. I have also arranged the gas-entrances in these downwardly-extending flues so that the gas passes into the air rising through the flues and becomes thoroughly intermingled therewith before entering the furnace-chamber. I have also carried the flue leading from the regenerator at the end opposite the stack back of the heating-chamber, this flue being inclosed within the walls of the furnace and under the same roof between the buckstaves and under the binders.

To enable others skilled in the art to make and use my invention, I will describe its construction and operation.

In the drawings, Figure 1 is a vertical longitudinal section on the line 1 1, Fig. 2. Fig. 2 is a horizontal section on the line 2 2, Fig. 1. Fig. 3 is a central cross-section through the furnace-chamber; and Fig. 4 is a cross-section of the regenerator at the end opposite the stack.

Like letters of reference indicate like parts in each.

The furnace illustrated is for puddling or boiling purposes, having the furnace bed or chamber $a$, provided with the working-door $b$, the bed being supported on the chill-plate $a'$, and having the chills $a^2$ in the walls thereof.

At each end of the chamber $a$ is the vertical flue $c$, communicating with the chamber through the neck $d$, over the bridge $d'$. This flue $c$ extends a short distance below the floor-level, its base being generally about two feet below the ground-level, and this being the lowest point of the furnace.

In the bridge-wall $d'$ is formed the chamber or pocket $e$, through which the perforated gas-supply pipe $e'$ passes, the chamber communicating with the flue $c$ through the horizontal gas-entrance $e^2$. The chamber is about ten inches deep, and the gas-pipe rests on the base thereof, so that the gas fills the chamber, and is forced in a solid stream across the air rising through the flue $c$ and more thoroughly mingles therewith, and the pipe is protected from the heat of the waste products passing through the flue.

Beyond the flues $c$, at the ends of the furnace, are the air-regenerators $f$, corresponding substantially in depth to the flues $c$, and communicating at the base with said flues through the ports $g$, the regenerators being built within the furnace-walls and under the same roof, and the furnace being thus compact, occupying but little space. The checker-work $h$ is supported in these regenerators in any suitable manner, being generally built on tile $h'$, supported on offsets $h^2$, and extending across the regenerators above the ports $g$. The regenerators are filled with checker-work close to the top thereof, and leading from one side or end at the top are the flues $k$, leading to the stack through the ordinary flap-valve. The flap-valve (not shown) is supported on the furnace between one regenerator and the stack, and the flue $k$ of that regenerator communicates directly with said valve. The flue $k$ of the opposite regenerator leads into the horizontal flue $l$, which extends along the back of the furnace between the chamber $a$ and the back plates or buckstaves $m$ to the flap-valve at the stack end of the furnace. This flue $l$ is thus inclosed within the walls of the furnace, instead of being carried underground under or at the side of the furnace, and it can be so inclosed without materially increasing the width of the furnace. The flue $l$ is covered by the roof $n$ of the furnace, and is under the binders $t$ of the buckstaves, so that it may be bound firmly together. This roof $n$ extends over the entire furnace, the parts over the regenerators being bound together by clamps, if so desired.

When the furnace is in operation, the air passes through the flap-valve into the flue $k$, thence down through the regenerator $f$ to the base thereof, and up through the vertical flue $c$ to the furnace-chamber, the gas being forced through the gas-entrance $e$ across the heated air as it is drawn up through the flue and mingled therewith, and the gas and air forming combustion in the furnace-chamber. The flame and heated products then pass through the neck $d$, and down through the flue $c$ at the opposite end of the furnace, entering the regenerator at the base and rising through it. It then passes through the flue $k$ into the flue $l$, and through that flue back of the furnace-chamber to the flap-valve and the stack. On reversing the furnace the air passes through the flues $l$ and $k$, down through the regenerator, and up through the flue $c$ at that end of the furnace, and, mingling with the gas, into the furnace-chamber, and the flame and heated products pass through the flue $c$, regenerator $f$, and flue $k$ to the stack. The furnace operates without blast, the draft of the stack being sufficient to draw in the air. The flame and intense heat are thus exhausted in the downwardly-extending flue $c$, and though at a high heat when passing through the regenerator they are not hot enough to melt or burn out the checker-work, so that the checker-work lasts from three to five times as long. If the intense heat melts down the walls of the flue $c$, the melted fire-brick runs down to the base of the flue and gathers there with the soot, red oxide of iron, &c., and is removed through a small pit at the side of the base of said flue. As the waste products rise through the regenerator there is no liability of the checker-work being clogged by this soot, red oxide of iron, &c., the square faces of the checker-brick breaking the current and causing them to drop back into the base of the regenerator, where they can be removed, and consequently the checker-work remains clean, and the full absorbing and heating surface is always exposed to the waste products and air passing through it. The melting of the walls of the flue $c$ cannot choke the regenerator, as in the ordinary Siemens regenerator, because it cannot flow from the flue into the checker-work. The return-flue along the back of the furnace-chamber occupies but little room, and is much more direct than the underground flue—this being important in draft-furnaces—and it avoids the necessity of having any part of the furnace far under ground, the lowest point of the furnace being two feet below the floor-level, and the furnaces can be built on ground made from slag without fear of igniting it. As the flues are all above ground, they can be more easily cleaned and repaired. The gas pockets or chambers are so constructed as to protect the gas-pipes and deliver the gas in a manner to cut and intermingle with the incoming air. The furnace is compact, being entirely inclosed between the buckstaves and under the binders, and hence but little heat is lost by radiation.

I have described the furnace as used with natural gas, but it is evident that some of the improvements can be employed where the gas is generated and fed to the furnace, and these are included as within my invention.

I am aware that in Letters Patent to Reese, No. 240,845, dated May 3, 1881, is shown a furnace in which the products of combustion enter the regenerators at the base, and therefore do not claim this, broadly; but in that furnace the flame and products of combustion pass directly into the regenerators, the regenerators extending above the roof, the products of combustion passing up and down within the regenerators, and consequently none of the advantages of exhausting the flame and high heat of the products of combustion before entering the regenerators are obtained, and the checker-work at the base of the regenerators would melt or burn out rapidly, and the weight of the checker-work on the lower courses compact them, and so render the regenerators inoperative.

I am also aware that in Letters Patent to Springer, No. 263,985, September 5, 1882, is shown apparatus for the manufacture of water-gas, in which regenerators are arranged on each side of a vertical combustion-chamber filled with carbonaceous material, vertical flues being arranged between the chamber of the regenerators and communicating with the chamber at different heights. In this apparatus, however, the principal course of the flame and heat is through the base of the combustion-chamber, and thence directly into the base of the regenerators, the carbonaceous matter in the upper part of the combustion-chamber being simply coked and not reaching a high heat.

What I claim as my invention, and desire to secure by Letters Patent, is—

1. A regenerative furnace for metallurgic purposes, having a furnace or working-chamber, an air-regenerator at each end of the furnace and inclosed under the same roof with the working-chamber, and a vertical flue extending down from each end of said chamber and entering the regenerator at the base thereof, substantially as and for the purposes set forth.

2. In regenerative furnaces, the combination, with the furnace-chamber and regenerator, of the vertical flue leading from the chamber to the base of the regenerator, and the gas chamber or pocket in said flue having the perforated gas-pipe therein, substantially as and for the purposes set forth.

3. In combination with the furnace-chamber $a$, bridge $d'$, and vertical flue $c$, the pocket $e$, having the horizontal gas-entrance $e^2$, and the gas-supply pipe $e'$ at the base thereof, substantially as and for the purposes set forth.

4. In regenerative furnaces, the combination, with the regenerator, of the flue communicating with the top of the regenerator and extending back of the furnace-chamber to the stack, substantially as and for the purposes set forth.

5. In regenerative furnaces, the flue $l$, communicating with one regenerator, at the top thereof and extending back of the furnace-chamber to the stack at the opposite end of the furnace, said flue being inclosed within the furnace-walls and under the same roof with the furnace-chamber, substantially as and for the purposes set forth.

In testimony whereof I, the said JOHN MORRISON, have hereunto set my hand.

JOHN MORRISON.

Witnesses:
H. T. MORRIS,
J. N. COOKE.